US012732259B2

(12) United States Patent
Buckner

(10) Patent No.: US 12,732,259 B2
(45) Date of Patent: Sep. 8, 2026

(54) PREDICTIVE BEAMFORMING ANTENNA AND METHOD OF CONTROLLING SAME

(71) Applicant: Microchip Technology Incorporated, Chandler, AZ (US)

(72) Inventor: Duke Buckner, Panama City Beach, FL (US)

(73) Assignee: Microchip Technology Incorporated, Chandler, AZ (US)

(*) Notice: Subject to any disclaimer, the term of this patent is extended or adjusted under 35 U.S.C. 154(b) by 9 days.

(21) Appl. No.: 18/921,237

(22) Filed: Oct. 21, 2024

(65) Prior Publication Data

US 2025/0132806 A1 Apr. 24, 2025

Related U.S. Application Data

(60) Provisional application No. 63/545,071, filed on Oct. 20, 2023.

(51) Int. Cl.
*H04B 7/08* (2006.01)
*H04B 7/06* (2006.01)
*H04W 64/00* (2009.01)

(52) U.S. Cl.
CPC ......... *H04B 7/0834* (2013.01); *H04B 7/0608* (2013.01); *H04W 64/003* (2013.01)

(58) Field of Classification Search
CPC .. H04B 7/0834; H04B 7/0608; H04B 7/0617; H04W 64/003
See application file for complete search history.

(56) References Cited

U.S. PATENT DOCUMENTS 6,016,120 A * 1/2000 McNabb .............. H01Q 1/1257 342/359
6,377,211 B1 * 4/2002 Hsiung .................. H01Q 1/125 342/359

(Continued)

FOREIGN PATENT DOCUMENTS

WO 2022184851 A1 9/2022

OTHER PUBLICATIONS

International Search Report & Written Opinion issued on Jan. 31, 2025 in corresponding International Application No. PCT/US2024/052235 (10 pages).

*Primary Examiner* — Chieh M Fan
(74) *Attorney, Agent, or Firm* — Shumaker, Loop & Kendrick, LLP; Ryan M. Corbett

(57) ABSTRACT

An apparatus that includes a beamforming antenna is provided. The apparatus may include a predictive calculator processing unit to receive position information of one or more airborne receivers, determine future position information of the one or more airborne receivers as a function of time based on the received position information, and determine beamforming antenna parameters. The apparatus may include an antenna instruction processing unit to receive the beamforming antenna parameters and generate beamforming instructions based on the beamforming antenna parameters, a beamforming antenna to receive the beamforming instructions, and to generate a beam at a specified time based on the beamforming instructions to enable communication with at least one of the one or more airborne receivers, and a receiver processing unit to receive airborne receiver data from the at least one of the one or more airborne receivers, and generate output data based on the airborne receiver data.

19 Claims, 3 Drawing Sheets

(56) References Cited

U.S. PATENT DOCUMENTS

| | | | | |
|---|---|---|---|---|
| 10,483,629 | B1 * | 11/2019 | Silva | H01Q 3/2605 |
| 12,461,250 | B1 * | 11/2025 | Saldanha Tavares | H04W 64/003 |
| 2012/0051284 | A1 * | 3/2012 | Chang | H04B 7/1851 370/316 |
| 2014/0266872 | A1 * | 9/2014 | Mitola, III | H04B 7/18521 342/356 |
| 2021/0258775 | A1 * | 8/2021 | Reis | H04B 7/024 |
| 2025/0046993 | A1 * | 2/2025 | Ofude | H01Q 3/08 |

* cited by examiner

PREDICTIVE BEAMFORMING ANTENNA AND METHOD OF CONTROLLING SAME

CROSS-REFERENCE TO RELATED APPLICATION

The present application claims priority to U.S. Provisional Patent Application No. 63/545,071, entitled: Predictive Beamforming Antenna and Method of Controlling Same, filed on Oct. 20, 2023, the contents of which are hereby incorporated by reference in their entirety.

TECHNICAL FIELD

The present disclosure relates generally to beamforming antennas and more specifically to beamforming antennas and methods of controlling beamforming antennas based on predicted locations of receiver antennas.

SUMMARY

According to an aspect of one or more examples, there is provided an apparatus that may include a predictive calculator processing unit to receive position information of one or more airborne receivers, determine future position information of the one or more airborne receivers as a function of time based on the received position information, and determine beamforming antenna parameters. The apparatus may include an antenna instruction processing unit to receive the beamforming antenna parameters and generate beamforming instructions based on the beamforming antenna parameters, a beamforming antenna to receive the beamforming instructions, and to generate a beam at a specified time based on the beamforming instructions to enable communication with at least one of the one or more airborne receivers, and a receiver processing unit to receive airborne receiver data from the at least one of the one or more airborne receivers, and generate output data based on the airborne receiver data.

The apparatus may also include a signal gap processing unit to determine a time difference between first airborne receiver data received at a first time and second airborne receiver data received at a second time, and to modify the output data based on the time difference. The output data generated by the receiver processing unit may include time information, and the signal gap processing unit may determine the time difference between first airborne receiver data received at the first time and second airborne receiver data received at the second time based on the time information. The one or more airborne receivers may include satellites orbiting earth, and the position information includes orbital information of the one or more airborne receivers. The orbital information may include orbital path information and orbital velocity information for the respective one or more airborne receivers.

The predictive calculator processing unit may determine the beamforming antenna parameters to enable forming the beam to enable communication with a predetermined number of airborne receivers at the specified time. The predetermined number of airborne receivers may include at least four airborne receivers. The predictive calculator processing unit may determine a first set of beamforming antenna parameters to enable forming a first beam to enable communication with a predetermined number of airborne receivers at a first time, determine a second set of beamforming antenna parameters to enable forming a second beam to enable communication with the predetermined number of airborne receivers at a second time, and compare a first beamwidth of the first beam and a second beamwidth of the second beam. The beamforming instructions generated by the antenna instruction processing unit may be based on the beamforming parameters corresponding to the narrower beam of the first beam and the second beam. The output data may be at least one of time, frequency, and position information. The future position information includes elevation and azimuth information.

The predictive calculator processing unit may determine a plurality of beamforming antenna parameters to enable forming a plurality of respective beams to enable communication with a plurality of respective airborne receivers at a plurality of respective specified times. The antenna instruction processing unit may generate a plurality of beamforming instructions respectively corresponding to the plurality of beamforming antenna parameters, and to randomize an order in which the plurality of beamforming instructions are transmitted to the beamforming antenna to generate a plurality of respective beams corresponding to the plurality of beamforming instructions. At least one of the beamforming antenna parameters and the beamforming instructions may include at least one of phase, amplitude, and frequency information for one or more antenna elements of the beamforming antenna. The one or more antenna elements of the beamforming antenna may include three or fewer radiating elements. The predictive calculator processing unit may receive the position information from a Global Navigation Satellite System (GNSS) almanac, and store the position information in a memory of the predictive calculator processing unit.

According to an aspect of one or more examples, there is provided a method that may include receiving position information of one or more airborne receivers, determining future position information of the one or more airborne receivers as a function of time based on the received position information, determining beamforming antenna parameters, generating beamforming instructions based on the beamforming antenna parameters, generating a beam at a specified time based on the beamforming instructions to enable communication with at least one of the one or more airborne receivers, receiving airborne receiver data from the at least one of the one or more airborne receivers, and generating output data based on the airborne receiver data. The method may also include determining a time difference between first airborne receiver data received at a first time and second airborne receiver data received at a second time, and modifying the output data based on the time difference. The generated output data may include time information, and the determined time difference between first airborne receiver data received at the first time and second airborne receiver data received at the second time may be based on the time information. The method may also include determining the beamforming antenna parameters to enable forming a beam to enable communication with a predetermined number of airborne receivers at the specified time. The method may also include determining a first set of beamforming antenna parameters to enable forming a first beam to enable communication with a predetermined number of airborne receivers at a first time, determining a second set of beamforming antenna parameters to enable forming a second beam to enable communication with the predetermined number of airborne receivers at a second time, comparing a first beamwidth of the first beam and a second beamwidth of the second beam. The generated beamforming instructions may be based on the beamforming parameters corresponding to the narrower beam of the first beam and the second beam.

The method may also include determining a plurality of beamforming antenna parameters to enable forming a plurality of respective beams to enable communication with a plurality of respective airborne receivers at a plurality of respective specified times, generating a plurality of beamforming instructions respectively corresponding to the plurality of beamforming antenna parameters, and randomizing an order of the plurality of beamforming instructions.

DETAILED DESCRIPTION OF VARIOUS EXAMPLES

Figure 1:
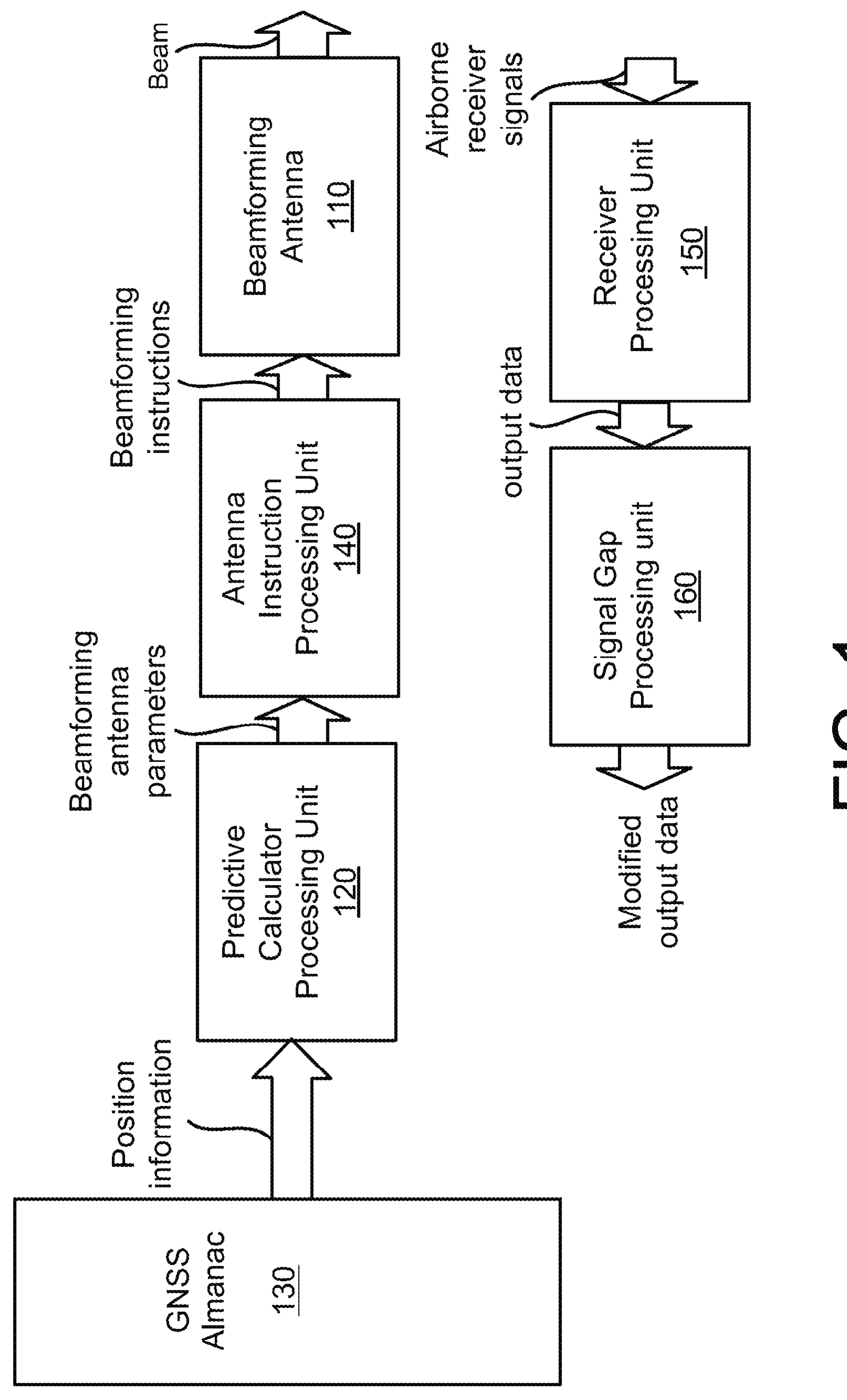
FIG. 1 shows a block diagram of a device that includes a beamforming antenna and components for controlling the beamforming antenna according to one or more examples.

Reference will now be made in detail to the following various examples, which are illustrated in the accompanying drawings, wherein like reference numerals refer to like elements throughout. The following examples may be embodied in various forms without being limited to the examples set forth herein.

Global navigation satellite systems (GNSS) are satellite constellations that provide positioning, navigation, and timing information on a global or regional basis. The Global Positioning System (GPS) is a widely known GNSS owned by the United States government, though other countries have developed similar systems, such as China's BeiDou Navigation Satellite System (BDS), the European Union's Galileo system, and the Russian Federation's GLONASS system. These systems use constellations of satellites orbiting the earth to transmit signals to receiver stations that use antennas to receive the transmitted signals. Antennas that emit omnidirectional radiation patterns may be able to receive signals from satellites located at a variety of azimuth and elevation angles, but may also be subject to jamming and spoofing caused by reception of interference signals. To mitigate this interference, controlled reception pattern antennas (CRPAs) may be used to steer a radiation pattern in a particular direction to receive a desired signal, and steer nulls in the direction of unwanted interference. CRPAs use multiple radiating elements, and control the amplitude and phase of the signals emitted from the radiating elements. The amplitude and phase of the signals are controlled to create constructive and destructive interference to form a beam in a direction of a desired signal, and create nulls in the direction of interference signals.

The resolution of the beam depends, at least in part, on the number of radiating elements in the antenna. In general, the resolution of the beam may be increased by using more radiating elements. Exporting CRPA technology using more than three radiating elements from the United States is restricted by International Traffic in Arms Regulations (ITAR), which limits the use of CRPAs having, for example, four, five, six, or seven radiating elements to a limited number of GNSS users. Therefore, users that are only able to use three-element CRPAs may not be able to achieve higher beam resolution, which may limit the ability to mitigate interference. Accordingly, there is a need for a beamforming antenna and method of controlling a beamforming antenna that may be able to mitigate interference with fewer radiating elements.

FIG. 1 shows a block diagram of a device 100 that includes a beamforming antenna 110 and components for controlling the beamforming antenna 110 according to one or more examples. The device 100 may include a predictive calculator processing unit 120 to receive position information of one or more airborne receivers, such as a GNSS satellite. The predictive calculator processing unit 120 may include one or more processors, a memory, and a transceiver for transmitting and receiving information to and from other devices or other components within the device 100 of FIG. 1. According to one or more examples, the airborne receiver may be a satellite orbiting the earth, and the position information may include orbital information of the satellite, such as the orbital path, altitude, and orbital velocity. The position information may be received from an external source, such as one or more GNSS almanacs 130 though other types of sources may be used, and may be stored in the memory of the predictive calculator processing unit 120.

The predictive calculator processing unit 120 may determine future position information of one or more of the airborne receivers as a function of time based on the position information. For example, the predictive calculator processing unit 120 may use the position information to compute the elevation angle and azimuth angle of one or more airborne receivers at various points in time. The predictive calculator processing unit 120 may determine beamforming antenna parameters to enable forming of a beam to enable communication with at least one of the one or more airborne receivers at a particular point in time. For example, the predictive calculator processing unit 120 may determine the amplitude and phase of the signals emitted from the radiative elements of a beamforming antenna 110 in order to form a beam that enables communication with an airborne receiver at an azimuth angle and elevation angle determined by the predictive calculator processing unit 120.

According to one or more examples, the predictive calculator processing unit 120 may calculate a plurality of beamforming antenna parameters to form a beam corresponding to the position of a first airborne receiver at a plurality of future times, and may calculate a plurality of beamforming antenna parameters to form a beam corresponding to the position of a second airborne receiver at a plurality of future times. As discussed further below, the plurality of beamforming antenna parameters may be used to sequentially form beams to enable communication with multiple airborne receivers.

According to one or more examples, the predictive calculator processing unit 120 may use the future position information of multiple airborne receivers to determine beamforming antenna parameters to form a beam that will enable communication with a predetermined number of airborne receivers at a specified time. For example, for a navigation application, the predictive calculator processing unit 120 may determine beamforming antenna parameters to generate a beam that will enable communication with a minimum of four airborne receivers at a given time. The predictive calculator processing unit 120 may determine beamforming antenna parameters to generate a beam that will enable communication with a minimum of four airborne devices at a plurality of times, and may determine the narrowest beam that will enable communication with the minimum number of airborne devices. Although a minimum of four airborne devices is used in the example described above, other predetermined numbers of devices or minimum numbers of devices may be used.

The device 100 according to the example of FIG. 1 may also include an antenna instruction processing unit 140 that may receive the beamforming antenna parameters from the predictive calculator processing unit 120 and generate beamforming instructions based on the beamforming antenna parameters. For example, the beamforming instructions may include amplitude and phase information for one or more radiative elements of the beamforming antenna 110. The beamforming instructions may also include timing information to direct the beamforming antenna 110 when to form a particular beam.

The example device 100 of FIG. 1 also may include a beamforming antenna 110 to receive the beamforming instructions from the antenna instruction processing unit 140, and generate one or more beams in a particular direction at a particular time. For example, the beamforming antenna 110 may have a plurality of radiating elements that emit respective radio frequency signals having amplitudes and phases corresponding to the beamforming instructions so that the signals constructively and destructively interfere with each other to create a beam in a particular direction. According to one or more examples, the number of radiating elements of the beamforming antenna 110 is three or fewer. According to one or more examples, the beamforming antenna 110 may generate multiple beams simultaneously to enable simultaneous communication with multiple airborne receivers. According to one or more examples, the beamforming antenna 110 may sequentially generate a plurality of beams to enable communication with a plurality of airborne receivers sequentially.

Figure 2:
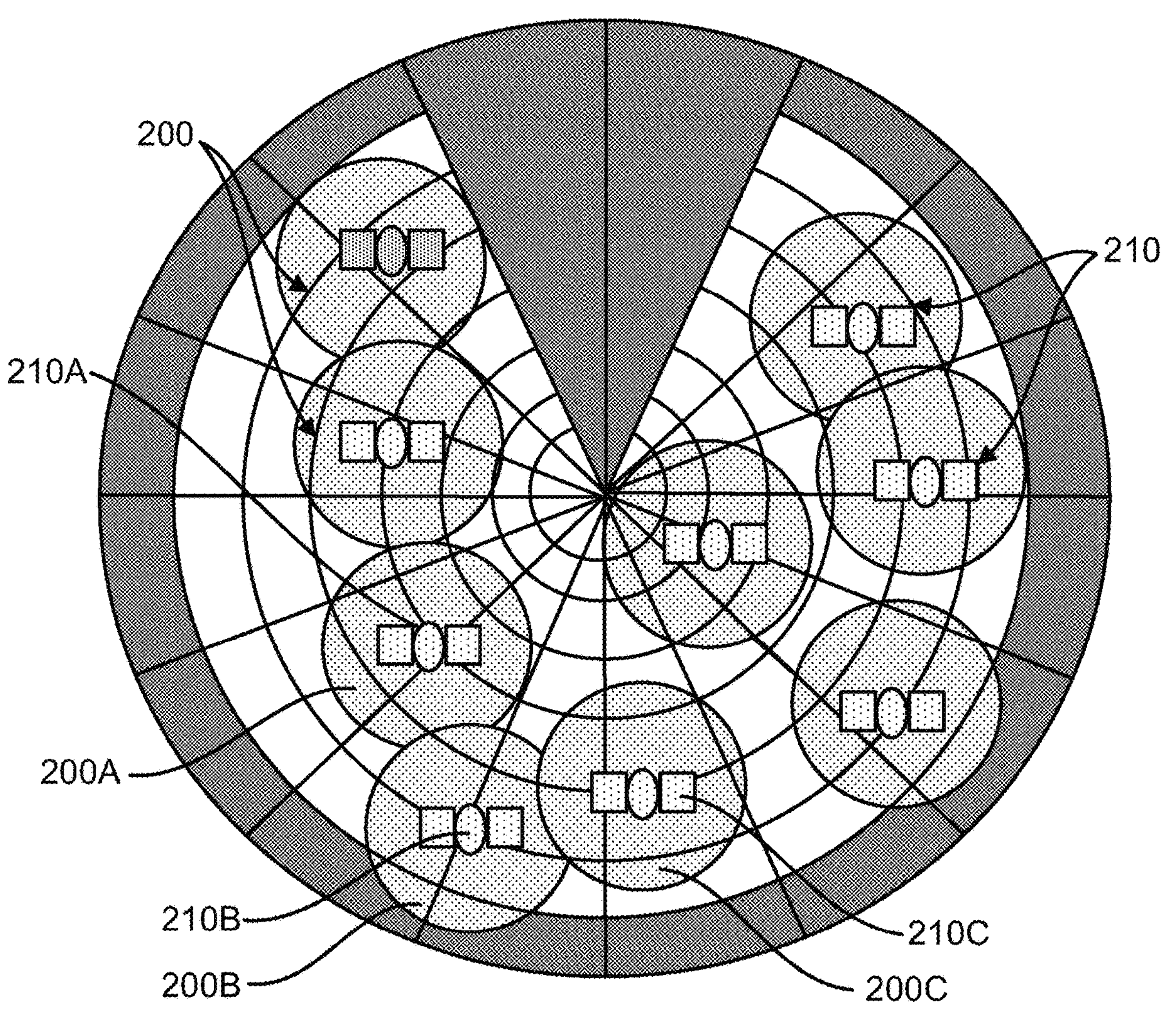
FIG. 2 depicts an example of a plurality of beams formed by a beamforming antenna to allow for communication with multiple airborne receivers according to one or more examples.

FIG. 2 depicts an example of a plurality of beams 200 formed by a beamforming antenna 110 to allow for communication with multiple airborne receivers 210 according to one or more examples. As shown in FIG. 2, a beamforming antenna 110 may generate a plurality of beams 200 based on the beamforming instructions, with each beam (e.g., 200A, 200B, and 200C) enabling communication with an airborne receiver (e.g., 210A, 210B, and 210C). The plurality of beams 200 may be formed simultaneously to enable simultaneous communication with the plurality of airborne receivers 210. According to one or more examples, the plurality of beams 200 may be formed sequentially to enable communication with one airborne receiver at a time. For example, the beamforming antenna 110 may form a first beam 200A to enable communication with a first airborne receiver 210A at a first time, a second beam 200B to enable communication with a second airborne receiver 210B at a second time, and a third beam 200C to enable communication with a third airborne receiver 210C at a third time. The elevation and azimuth angles of each beam (e.g., 200A, 200B, and 200C) are determined by the predictive calculator processing unit 120 based on the future location of the corresponding airborne receiver (e.g., 210A, 210B, and 210C) at the relevant time. By generating beams 200 at specific times based on the future position information of an airborne receiver 210, interference may be mitigated because the interference signals would not only need to be directed at a specific direction to create harmful interference, but would also need to be directed in the specific direction at a specific time. Therefore, varying the time and direction of the beams 200 may help prevent jamming and spoofing attempts.

With further reference to FIG. 2, according to one or more examples, the beamforming antenna 110 may generate a plurality of beams 200 to enable communication with a plurality of airborne receivers 210, and may enable communicate with each airborne receiver (e.g., 210A, 210B, and 210C) at different times. For example, the beamforming antenna 110 may generate a first beam 200A to enable communication with a first airborne receiver 210A at a first time, and generate second and third beams 200B and 200C to enable communication with respective second and third receivers 210B and 210C at second and third times. The beamforming antenna 110 may then generate a fourth beam (not shown in FIG. 2) to again enable communication with the first airborne receiver 210A at a fourth time. The fourth beam may have different elevation and azimuth angles as compared to the first beam 200A because the first airborne receiver 210A has moved to a different position between the first time and the fourth time. The beamforming antenna 110 may also generate additional beams (not shown in FIG. 2) to enable communication with the second and third airborne receivers 210B and 210C at subsequent times when the second and third airborne receivers 210B and 210C have moved to respective new positions since the second and third beams 200B and 200C were generated at the second and third times. The beamforming antenna 110 may continue forming beams 200 to cyclically communicate with multiple airborne receivers 210 based on the future position information of the respective airborne receivers 210.

According to one or more examples, the antenna instruction processing unit 140 may randomize the order in which the beamforming instructions are provided to the beamforming antenna 110 to generate the respective beams 200 corresponding to the beamforming instructions. For example, the beamforming instructions may be arranged in an order to cause the beamforming antenna 110 to sequentially generate a plurality of beams 200 to enable communications with respective first, second, and third airborne receivers 210A, 210B, and 210C. To enable communications with the first, second, and third airborne receivers 210A, 210B, and 210C at subsequent times, instead of providing beamforming instructions to enable communication in the same order (e.g., first airborne receiver 210A followed by the second airborne receiver 210B, followed by the third airborne receiver 210C), the antenna instruction processing unit 140 may change the order so that the beamforming antenna 110 forms a beam 200C to enable communication with, for example, the third airborne receiver 210C, followed by a beam 200B to enable communication with the second airborne receiver 210B, followed by a beam 200A to enable communication with the first airborne receiver 210A. By randomizing the order in which beams 200 are formed to enable communication with respective airborne receivers 210, attempts to intentionally interfere with the communications may be more difficult because the timing of the beams 200 may be less predictable.

Figure 3:
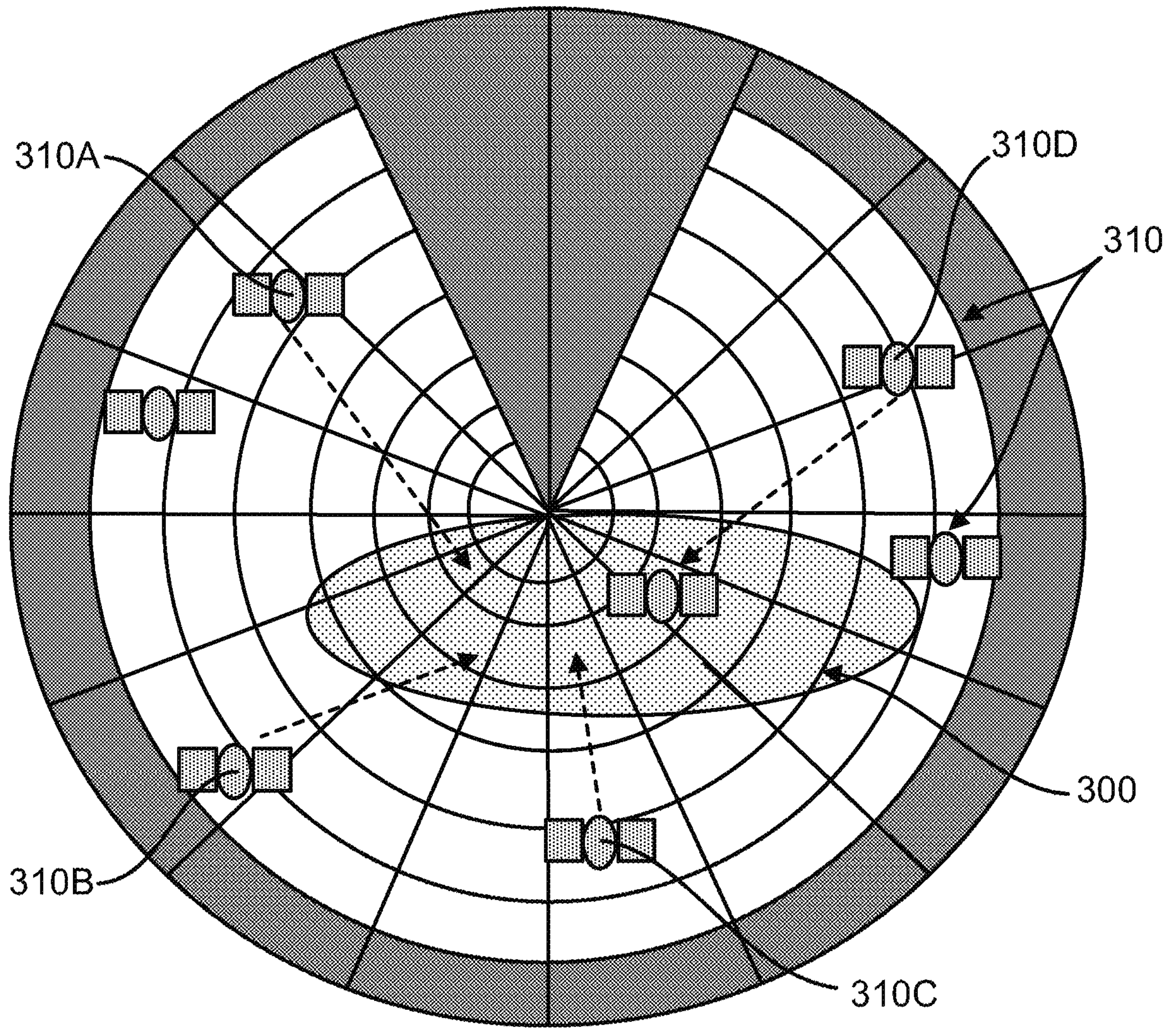
FIG. 3 depicts an example of a beam formed by a beamforming antenna to allow for communication with multiple airborne receivers according to one or more examples.

FIG. 3 depicts an example of a beam 300 formed by a beamforming antenna 110 to allow for communication with multiple airborne receivers 310 according to one or more examples. As shown in FIG. 3, the beamforming antenna 110 may form a beam 300 based on the future position information of a plurality of airborne receivers 310 that encompasses the plurality of airborne receivers 310 at a particular time. As described above, the predictive calculator processing unit 120 may determine beamforming parameters to form a beam 300 that encompasses multiple airborne receivers 310 simultaneously. As shown in FIG. 3, the beam 300 may encompass airborne receivers 310A, 310B, 310C, and 310D, simultaneously. The predictive calculator processing unit 120 may determine multiple beamforming antenna parameters that would form a beam (e.g., beam 300) encompassing multiple airborne receivers 310 (e.g., airborne receivers 310A, 310B, 310C, and 310D) simultaneously, and may determine which beamforming antenna parameters would result in the narrowest beam 300 that would enable communication multiple airborne receivers 310 simultaneously. The predictive calculator processing unit 120 may transmit the beamforming antenna parameters corresponding to the narrowest beam 300 to the antenna instruction processing unit 120 to generate corresponding beamforming instructions. By using the narrowest beam 300, and generating the beam 300 at a particular time based on the future position information of the airborne receivers 310, interference associated with jamming and spoofing may be mitigated.

Referring again to FIG. 1, the device 100 may include a receiver processing unit 150, such as a GNSS receiver. The receiver processing unit 150 may receive signals from one or more airborne receivers (e.g., airborne receivers 210 in FIG. 2, or airborne receivers 310 in FIG. 3). Because the beam formed by the beamforming antenna 110 is generated in a specific direction and at a specific time, interference from spoofing or jamming may be mitigated. The receiver processing unit 150 may receive raw data from the one or more airborne receivers, and may determine and provide output data based on the raw data received from the one or more airborne receivers. The output data may include position, frequency, and time information.

The example device 100 of FIG. 1 may also include a signal gap processing unit 160 that may determine a time difference between airborne receiver data received at a first time and airborne receiver data received at a second time, and may modify the output data based on the determined time difference. For example, according to one or more examples in which beams are sequentially formed for individual airborne receivers, as described in FIG. 2, the signal gap processing unit 160 may determine the time difference between the airborne receiver data received from different receivers (e.g., airborne receivers 210 in FIG. 2), and may adjust the output time, frequency, or position data based on the determined time difference. According to one or more examples in which a beam is formed to encompass multiple airborne receivers simultaneously, as described in FIG. 3, airborne receiver signals may be received at different times due to the differing distances between the receiver processing unit 150 and the respective airborne receivers (e.g., airborne receivers 310 in FIG. 3). The signal gap processing unit 160 may determine time differences between the airborne receiver signals received by the receiver processing unit 150, and may adjust the output data based on the time difference. According to one or more examples, the output data generated by the receiver processing unit 150 may include time information, and the signal gap processing unit 160 may determine the time difference between the first airborne receiver data received at the first time and the second airborne receiver data received at the second time based on the time information.

Various examples have been disclosed herein, in connection with the above description and the drawings. It will be understood that it would be unduly repetitious to literally describe and illustrate every combination and subcombination of these examples. Accordingly, all examples can be combined in any way or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. An apparatus comprising:

a predictive calculator processing unit comprising a processor, a memory, and a transceiver, the predictive calculator processing unit configured to receive position information of one or more airborne receivers, determine future position information of the one or more airborne receivers as a function of time based on the received position information, and determine beamforming antenna parameters;

an antenna instruction processing unit to receive the beamforming antenna parameters and generate beamforming instructions based on the beamforming antenna parameters;

a beamforming antenna to receive the beamforming instructions, and to generate a beam at a specified time based on the beamforming instructions to enable communication with at least one of the one or more airborne receivers;

a receiver to receive airborne receiver data from the at least one of the one or more airborne receivers, and generate output data based on the airborne receiver data; and a signal gap processing unit to determine a time difference between first airborne receiver data received at a first time and second airborne receiver data received at a second time, and to modify the output data based on the time difference.

2. The apparatus of claim 1, wherein the output data generated by the receiver comprises time information, and the signal gap processing unit determines the time difference between first airborne receiver data received at the first time and second airborne receiver data received at the second time based on the time information.

3. The apparatus of claim 1, wherein the one or more airborne receivers include satellites orbiting earth, and the position information includes orbital information of the one or more airborne receivers.

4. The apparatus of claim 3, wherein the orbital information includes orbital path information and orbital velocity information for the respective one or more airborne receivers.

5. The apparatus of claim 1, wherein the predictive calculator processing unit is to determine the beamforming antenna parameters to enable forming the beam to enable communication with a predetermined number of airborne receivers at the specified time.

6. The apparatus of claim 5, wherein the predetermined number of airborne receivers is at least four airborne receivers.

7. The apparatus of claim 1, wherein the predictive calculator processing unit is to determine a first set of beamforming antenna parameters to enable forming a first beam to enable communication with a predetermined number of airborne receivers at a first time, determine a second set of beamforming antenna parameters to enable forming a second beam to enable communication with the predetermined number of airborne receivers at a second time, and compare a first beamwidth of the first beam and a second beamwidth of the second beam; and wherein the beamforming instructions generated by the antenna instruction processing unit are based on the beamforming parameters corresponding to the narrower beam of the first beam and the second beam.

8. The apparatus of claim 1, wherein the output data is at least one of time, frequency, and position information.

9. The apparatus of claim 1, wherein the future position information includes elevation and azimuth information.

10. The apparatus of claim 1, wherein the predictive calculator processing unit is to determine a plurality of beamforming antenna parameters to enable forming a plurality of respective beams to enable communication with a plurality of respective airborne receivers at a plurality of respective specified times; and wherein the antenna instruction processing unit is to generate a plurality of beamforming instructions respectively corresponding to the plurality of beamforming antenna parameters, and to randomize an order in which the plurality of beamforming instructions are transmitted to the beamforming antenna to generate a plurality of respective beams corresponding to the plurality of beamforming instructions.

11. The apparatus of claim 1, wherein at least one of the beamforming antenna parameters and the beamforming instructions include at least one of phase, amplitude, and frequency information for one or more antenna elements of the beamforming antenna.

12. The apparatus of claim 11, wherein the one or more of antenna elements of the beamforming antenna comprises three or fewer radiating elements.

13. The apparatus of claim 1, wherein the predictive calculator processing unit receives the position information from a Global Navigation Satellite System (GNSS) almanac, and stores the position information in the memory of the predictive calculator processing unit.

14. The apparatus of claim 1, wherein the receiver is a Global Navigation Satellite System (GNSS) receiver.

15. A method comprising:

receiving position information of one or more airborne receivers;

determining future position information of the one or more airborne receivers as a function of time based on the received position information;

determining beamforming antenna parameters;

generating beamforming instructions based on the beamforming antenna parameters;

generating a beam at a specified time based on the beamforming instructions to enable communication with at least one of the one or more airborne receivers;

receiving airborne receiver data from the at least one of the one or more airborne receivers;

generating output data based on the airborne receiver data;

determining a time difference between first airborne receiver data received at a first time and second airborne receiver data received at a second time; and modifying the output data based on the time difference.

16. The method of claim 14 further comprising:

wherein the generated output data comprises time information, and the determined time difference between first airborne receiver data received at the first time and second airborne receiver data received at the second time is based on the time information.

17. The method of claim 15 further comprising:

determining the beamforming antenna parameters to enable forming a beam to enable communication with a predetermined number of airborne receivers at the specified time.

18. The method of claim 15 further comprising:

determining a first set of beamforming antenna parameters to enable forming a first beam to enable communication with a predetermined number of airborne receivers at a first time;

determining a second set of beamforming antenna parameters to enable forming a second beam to enable communication with the predetermined number of airborne receivers at a second time;

comparing a first beamwidth of the first beam and a second beamwidth of the second beam;

wherein the generated beamforming instructions are based on the beamforming parameters corresponding to the narrower beam of the first beam and the second beam.

19. The method of claim 15 further comprising:

determining a plurality of beamforming antenna parameters to enable forming a plurality of respective beams to enable communication with a plurality of respective airborne receivers at a plurality of respective specified times;

generating a plurality of beamforming instructions respectively corresponding to the plurality of beamforming antenna parameters;

randomizing an order of the plurality of beamforming instructions.

* * * * *